United States Patent [19]

Truty

[11] Patent Number: 5,585,013
[45] Date of Patent: Dec. 17, 1996

[54] ELECTRODE GUIDE

[76] Inventor: Thomas J. Truty, 11 Windemere La., S. Barrington, Ill. 60010

[21] Appl. No.: 418,452

[22] Filed: Apr. 7, 1995

[51] Int. Cl.⁶ .............................. B23H 7/10; B23K 9/00
[52] U.S. Cl. .................... 219/69.12; 219/69.15; 219/137.61
[58] Field of Search ................ 219/69.12, 69.15, 219/69.2, 137.61

[56] References Cited

U.S. PATENT DOCUMENTS

| | | | |
|---|---|---|---|
| 2,974,216 | 3/1961 | Inoue | 219/69.12 |
| 4,205,212 | 5/1980 | Ullmann et al. | 219/69.12 |
| 4,605,834 | 8/1986 | Inoue | 219/69.12 |
| 4,686,344 | 8/1987 | Nakayama | 219/69.12 |
| 4,883,933 | 11/1989 | Yatomi et al. | 219/69.12 |
| 5,214,260 | 5/1993 | Fricke | 219/69.12 |

FOREIGN PATENT DOCUMENTS

| | | | |
|---|---|---|---|
| 60-228026 | 11/1985 | Japan . | |
| 60-228028 | 11/1985 | Japan . | |
| 60-228027 | 11/1985 | Japan | 219/69.12 |
| 1-153222 | 6/1989 | Japan | 219/69.12 |
| 4-35815 | 2/1992 | Japan | 219/69.12 |

*Primary Examiner*—Geoffrey S. Evans
*Attorney, Agent, or Firm*—George Pappas

[57] ABSTRACT

An electrode guide for electrical discharge machines and welding apparatus. The electrode guide includes at least three sphere-shaped balls in contact with one another and forming an opening therebetween whereat the electrode is received and is guided by the outer surface of each of the balls. The balls are urged toward a frusto-conical shaped bore which forces the balls toward the longitudinal axis of the frusto-conical surface and in contact with one another. The balls can be located within a sphere-shape passageway whereat the balls can rotate with respect to one another in response to angular displacement of the electrode thereby providing a smooth bearing surface for taper cutting. A second set of three sphere-shaped balls can also be provided adjacent the first set of balls in a nesting relation therewith for guiding the electrode through the openings created by both sets of balls.

38 Claims, 3 Drawing Sheets

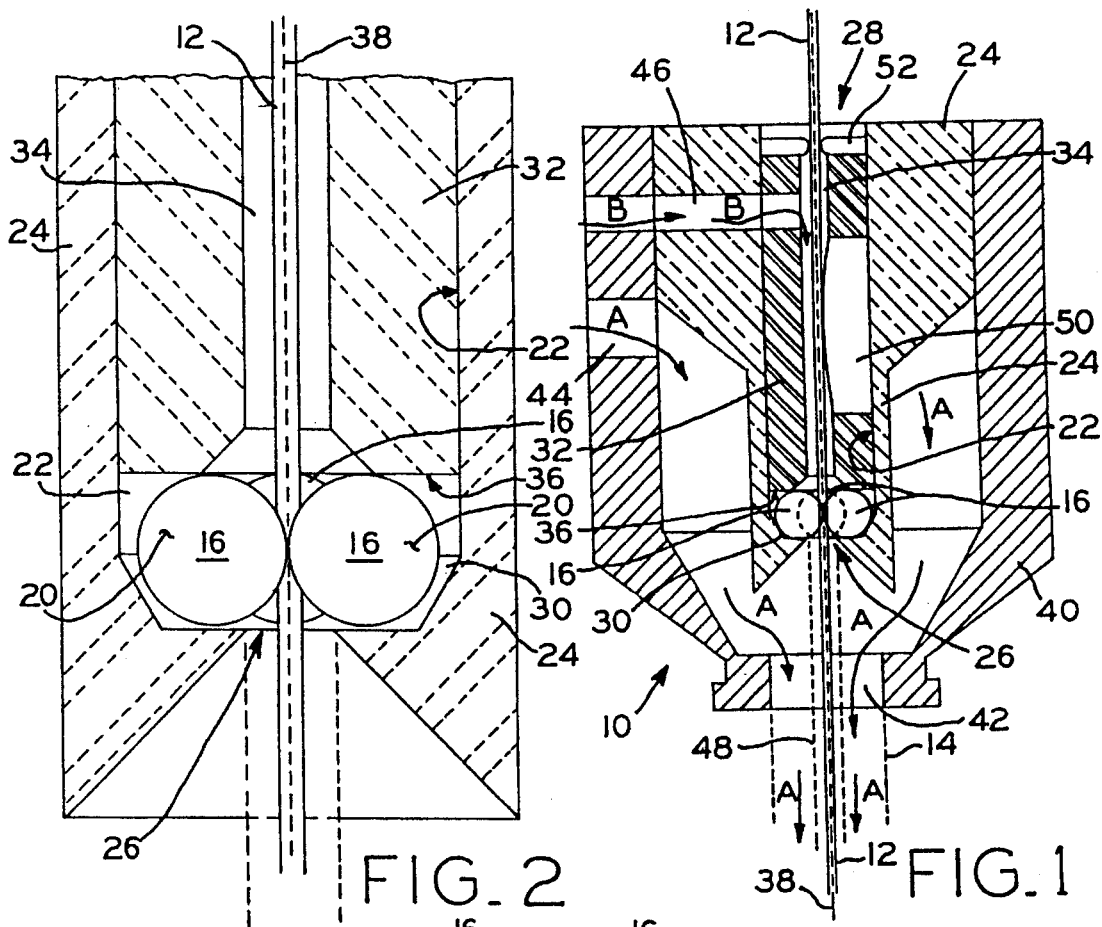
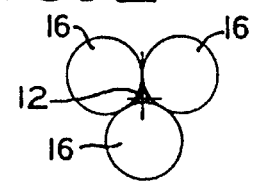
FIG_7a
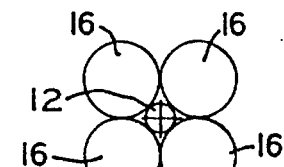
FIG_7b
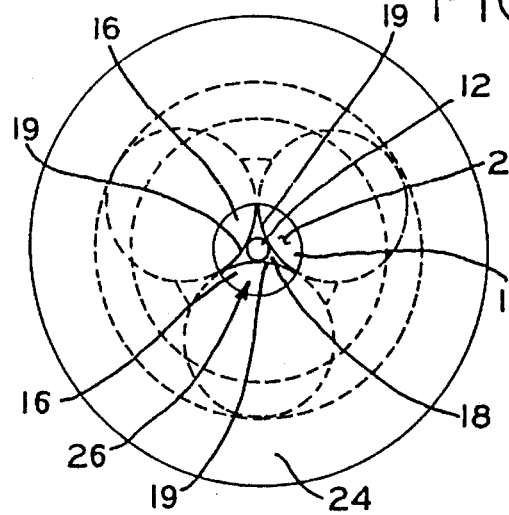
FIG_2a
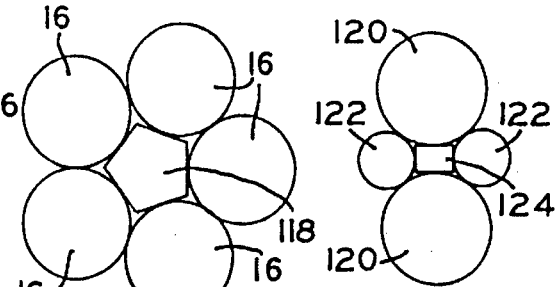
FIG_7c
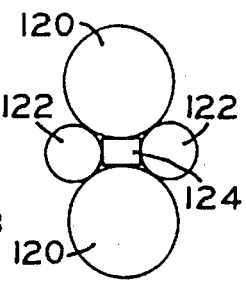
FIG_7d

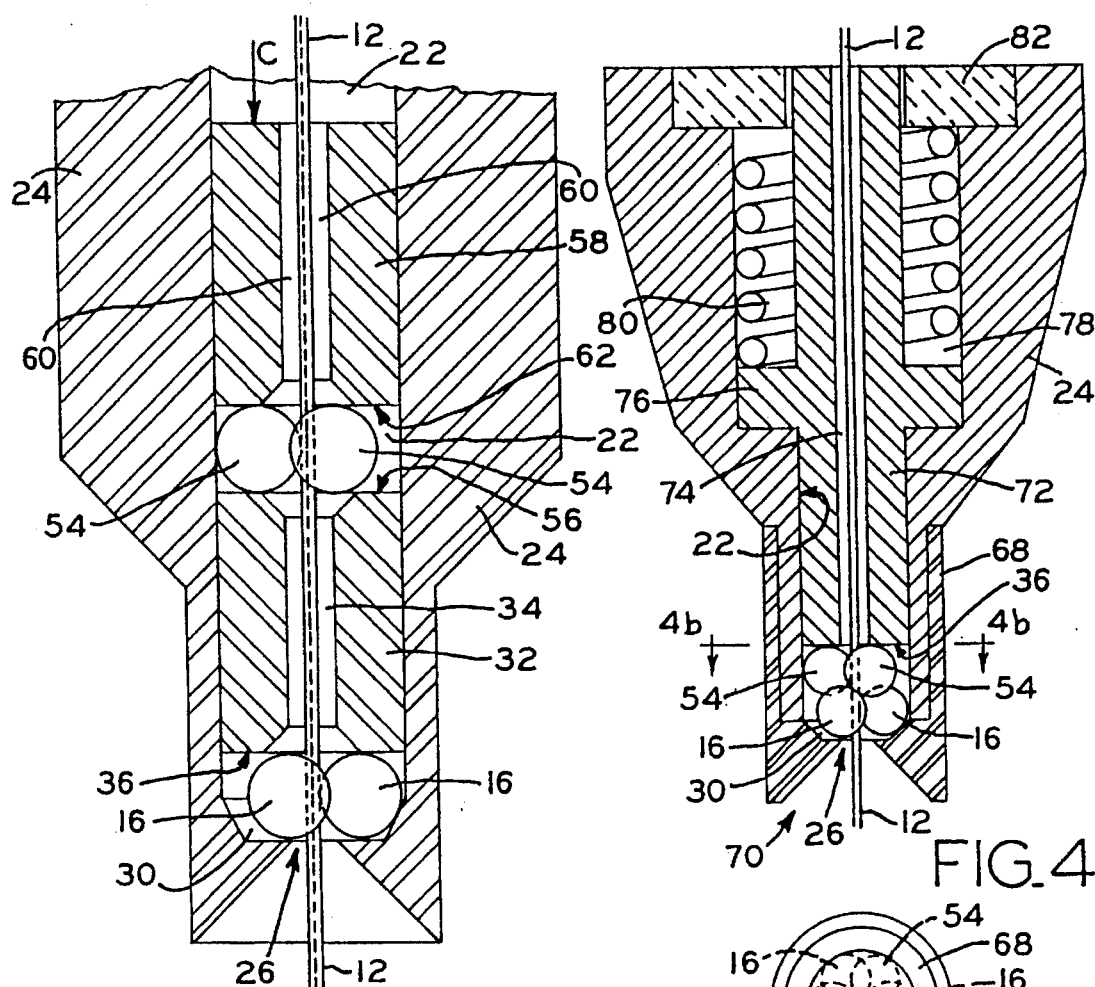
FIG. 3
FIG. 4
FIG. 4a
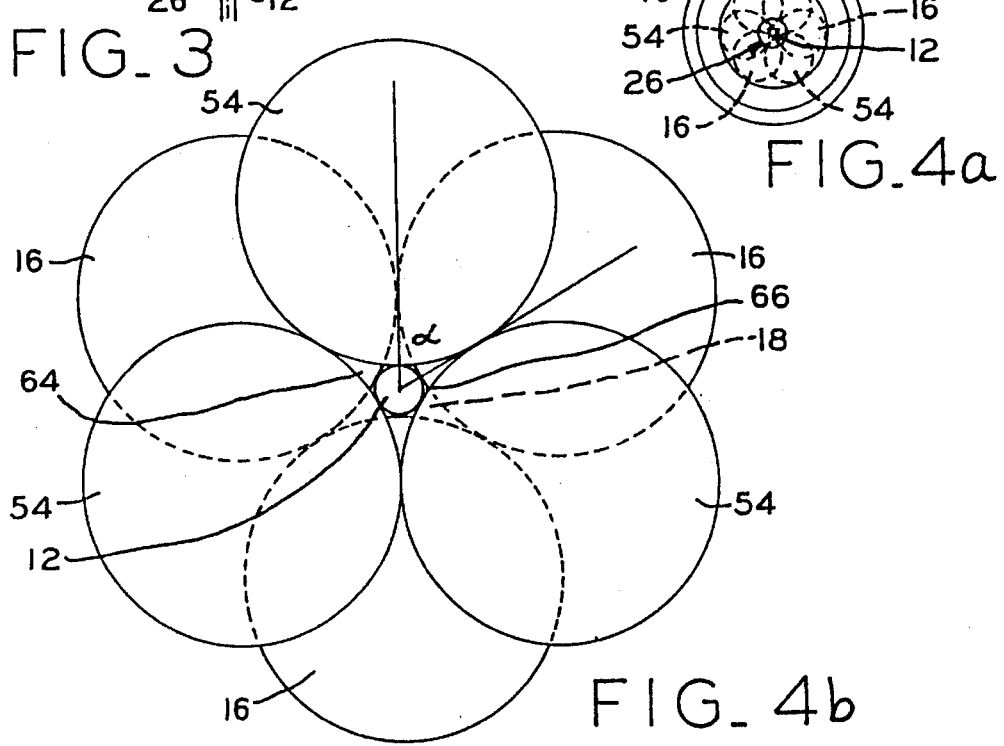
FIG. 4b

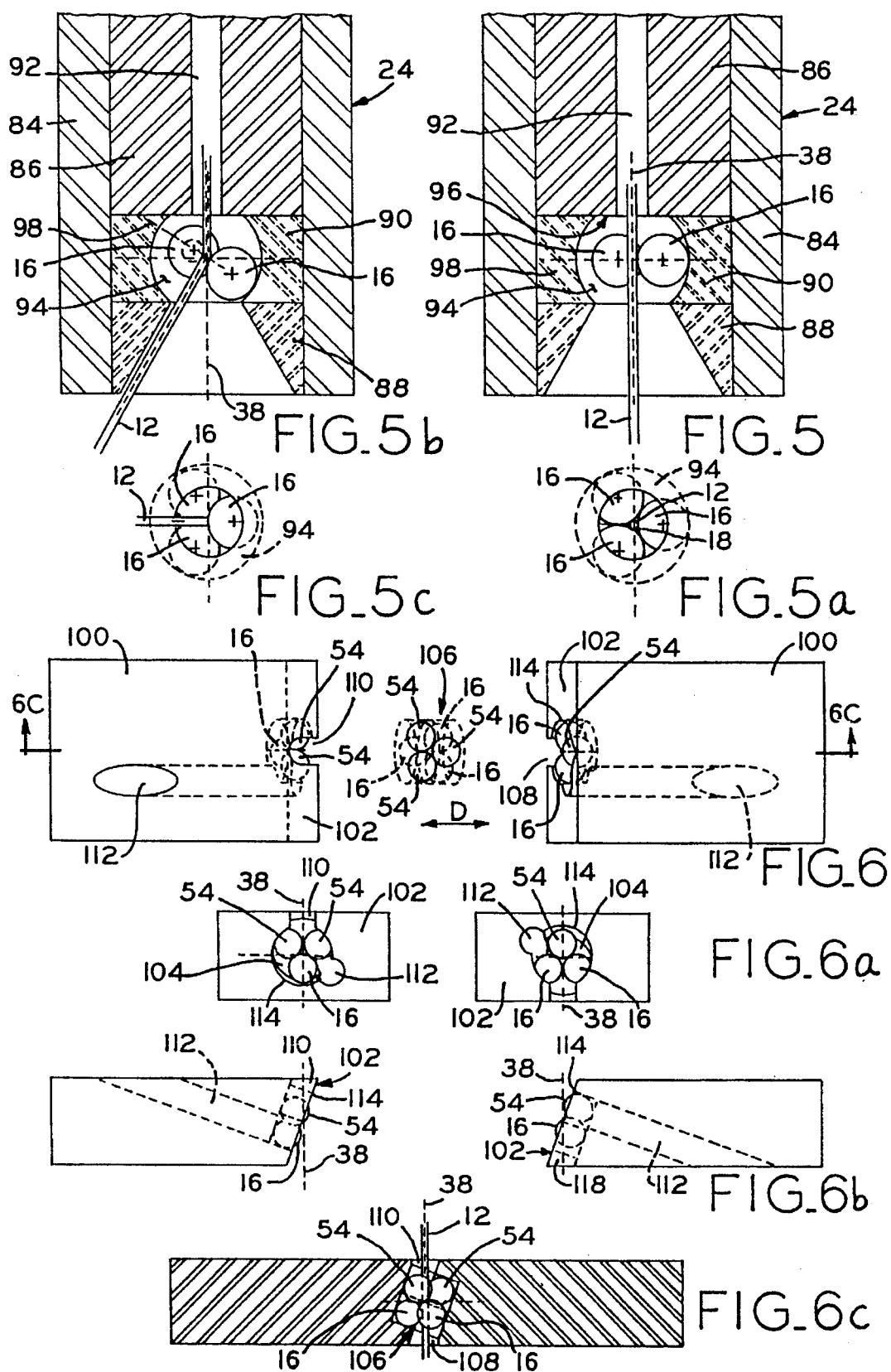

ELECTRODE GUIDE

TECHNICAL FIELD

The present invention relates to the technical field of apparatus for guiding electrodes that are typically used in electrical discharge machines (EDM) and welding machines. More particularly, the present invention relates to a device for accurately and economically guiding a moving electrode or supporting a stationary electrode in electrical discharge machines or welding apparatus.

BACKGROUND OF THE INVENTION

EDM's are presently commonly used for making precise cuts and shaping various electrically conductive materials or workpieces. The cutting and shaping of the workpiece is accomplished by precisely placing the electrode close to the workpiece and placing the workpiece and electrode at different electrical potentials and thereby causing electrical sparks to occur between the electrode and the workpiece. The sparks erode the workpiece in a desired manner and simultaneously consume the electrode.

For boring holes and other shapes into a workpiece, an electrode such as a rod-shaped, tube-shaped, etc., member is accurately lowered onto the workpiece thereby causing electro-erosion therebetween and forming a bore or hole in the workpiece which is a mirror image of the electrode. Because the electrode is also eroded during the cutting process, it must continuously be replenished for achieving the desired depth.

For cutting through a workpiece, EDM's typically utilize a wire electrode which is wound around and travels between two turning spools. Wire guides are used to accurately locate the moving wire electrode with respect to the workpiece so that sparks occurring between the wire and workpiece effectively and accurately cut through the workpiece. Here, the wire electrode is not totally consumed but, rather, is continuously being replenished as its exterior surface is spark eroded.

In welding apparatus, a wire electrode is again used and is guided through a guiding device and onto the workpiece. A bushing is often used for guiding the wire. The bushing may also be used as a current transfer element. Various gases such as metal inert gases can be used and are typically provided around the juncture between the workpiece and electrode for enhancing the welding process. The heat generated due to the different electrical potential between the workpiece and electrode deposits the electrode as it is fed toward the workpiece through the guiding device.

Wire electrode EDM's generally require substantially more accurate guidance of the wire than welding apparatus. In this regard, early wire EDM guide systems used a V-shaped component made of ruby or sapphire for accurately guiding the moving wire electrode. Unfortunately, V-shaped guides cause difficulties when generating taper/conical cuts, since the angular pivot point of the wire shifts with the conical direction.

More recently, orifice-shaped or type guides have been employed for guiding the moving wire electrode. The orifice is typically manufactured to be slightly larger than the wire electrode diameter. The wire electrode is passed through an upper guide and a lower guide which are each selectively movable with respect to each other and the workpiece. Accordingly, the wire electrode is exposed to the workpiece at any desired angle and cutting direction. The orifices are typically toroid-shaped and are preferably made through diamond, although carbide, ceramic, ruby and sapphire can be used as well.

Although orifice-type guides generally provide a sufficient means for guiding the wire electrode, they too have substantial shortcomings. So as to provide a sufficiently lasting orifice guide, typically a material with extreme hardness such as diamond is required. Although industrial diamonds themselves are not expensive, geometrically consistent machining and polishing of complex toroidal shapes through the diamonds for forming the orifice is substantially time-consuming and expensive. Additionally, the diamond orifice is typically located in a diamond wafer which is then captivated in a metal mount. Unfortunately, the metal mount is itself subject to erosion which eventually can expose the diamond wafer or disk and exposing an undesirable ledge. Exposed ledges of this character can hamper wire threading and can render automatic threading operations impractical.

Additional difficulties with respect to orifice-type guides have also been encountered due to the frictional forces and extreme heating of the electrode. Electrical cutting current is necessarily transferred through the electrode which causes resistive heating. This heating limits efficiency of the process to the point at which the wire can be cooled. Additionally, because the wire diameter is substantially the same as that of the orifice, even though a dielectric fluid is provided thereat, the fluid cannot easily travel through the orifice for cooling the walls thereof. Indeed, so as to achieve higher accuracies, the wire electrode is the same diameter as that of the orifice and effectively prevents dielectric fluid flow therethrough. This restriction can cause additional problems due to electro eroded particulates and other debris accumulating near or at the orifice.

Accordingly, a need exists for an electrode guide that solves the problems and shortcomings associated with prior electrode guiding devices and which is generally inexpensive to manufacture and yet has a sufficiently long life and is capable of accurately locating the electrode.

SUMMARY OF THE INVENTION

It is the principal object of the present invention to overcome the above-discussed disadvantages associated with prior electrode guide devices.

It is further the object of the present invention to provide an accurate positioning electrode guide which is inexpensive to manufacture consistently.

Another object of the present invention is to provide an electrode guide which can be either statically or dynamically repositioned to refresh and expose different wear surfaces and which is not subject to parasitic current electroerosion of the orifice diamond mount which can hamper wire threading.

Yet another object of the present invention is to provide an electrode guide which can easily be increased in size for enhancing and more easily allowing the passage of the electrode therethrough, for example, during automatic threading operations.

A further object of the present invention is to provide selective dynamic grasping of the electrode for threading, advancing, cutting, stretching, placing, etc., of the electrode.

Another object of the present invention is to provide an electrode guide which allows the passage of the dielectric fluid or gas near the guide and electrode in order to cool the entire electrode and the electrode guide and to remove potentially harmful particulates and debris from the electrode guide.

Yet another object of the present invention is to provide a dielectric fluid traveling through the electrode guide which is at a lower temperature than the dielectric traveling over and around the guide and electrode thereby more effectively cooling the guide and the electrode while decreasing the volume of dielectric fluid required for cooling and simultaneously reducing the dielectric velocity and harmful effects associated therewith.

A yet further object of the present invention is to provide a jaw-type electrode guide which is generally inexpensive to manufacture and which is self-nesting thereby assisting automatic threading by separating the jaws and providing electrode guidance by closure thereof.

Yet another object of the present invention is to provide accurate angular or taper cutting by providing a smooth circular bearing surface as the electrode exits the guide at an angle therewith.

Still another object of the present invention is to provide an integrated pressurized collimated stream of dielectric to propel the electrode wire from one guide to the other eliminating the need for separate jet elements in an auto-thread function.

A further object of this invention is to provide a dynamic guide bearing which adjusts concentrically to varying electrode diameter while sustaining electrode squareness (or angularity) with relation to the workpiece.

The present invention overcomes the disadvantages associated with prior electrode guides and achieves at least the above-discussed objects by providing an electrode guide incorporating at least three sphere-shaped balls in contact with one another and forming an opening therebetween whereat an electrode is received and guided. The opening is generally triangular-shaped with circular curved sides and the wire electrode therein is in tangential contact with the outer surface of one or all of the balls. Although three balls of equal size are sufficient, more than three balls and/or different size balls can be incorporated for different desired electrode guidance systems.

The balls preferably rest on a frusto-conical shaped surface within a bore extending through a guide housing. The electrode opening between the balls is aligned with the bore and the electrode extends through the bore and the guide opening. A first cylindrical member is preferably located coincident with the housing bore adjacent the balls and sandwiching the balls between the frusto-conical surface and the first cylindrical member. The first cylindrical member is selectively biased toward the frusto-conical surface and balls thereby forcing the balls towards the longitudinal axis of the frusto-conical surface and in contact with one another. By properly sizing the balls and diameter of the electrode, the electrode can either be selectively grasped in the opening or allowed to travel therethrough and be guided by the outer surface of the balls forming the generally triangular opening.

A second set of at least three sphere-shaped balls can be provided to insure that the longitudinal center of the electrode remains coincident with the longitudinal center of the guide assembly. Maintenance of this relationship is important in aiming the electrode in auto-threading operations and also to maintain electrode squareness (or angularity) with the work-piece in drilling operations. The second set of balls can be provided at the other end of the first cylindrical member and a second cylindrical member provided for sandwiching the second set of balls between the first and second cylindrical members. The electrode extends through the openings created by both sets of balls and also through the first and second cylindrical members. A spring is provided for biasing both cylindrical members and both sets of balls toward the first end of the bore. Accordingly, the electrode can be selectively guided or grasped at two different longitudinal locations for providing greater accuracy and reliability.

In another embodiment, a second set of at least three sphere-shaped balls in contact with one another and forming an opening therebetween are provided adjacent the first set of balls in a nesting relation therewith. Both first and second sets of balls are located in planes generally perpendicular to the electrode and the second set of balls are radially shifted with respect to the first set of balls at an angle of 360 degrees divided by the total number of balls in both of the ball sets. Accordingly, the generally triangular-shaped openings of both sets of balls are aligned for receiving the electrode therethrough.

So as to flush out any particulates or other debris, a deionized fluid is forced into the housing bore and toward the balls forming the opening. Advantageously, the fluid travels around each of the balls and also through the opening formed therebetween around the electrode and near the area of contact between each of the balls. The fluid is further forced out of the guide and around the electrode. Accordingly, debris and other particulates are continuously flushed out of the guide area and the electrode is surrounded by dielectric fluid even outside of the guide thereby retaining a cooler temperature thereat. For further enhancing heat transfer from the electrode, the dielectric fluid being forced into the bore can be provided at a substantially low temperature just above freezing. For increasing efficiency, however, a flush cup can be provided around the housing and dielectric fluid at ambient temperature forced therein for exiting through a flush cup hole along with the electrode and around the cooler dielectric fluid and the electrode. The aforementioned deionized fluid can also be used to impart a kinetic impetus to the wire to effect automatic threading operations. The orifice formed by the end of the guide coincidentally creates a collimated dielectric stream which can serve to drive the electrode toward a receiving ball guide.

For taper cutting and to generate conical workpieces, the housing bore is provided with a sphere-shaped passageway whereat the balls are located and retained. As the upper and lower guides are moved for placing the electrode at an angle with respect to the normal line of electrode travel, the balls turn within the spheric-shaped passageway and continuously provide a smooth round surface in contact with the electrode. In general, the balls tend to turn so as to continuously be in a plane perpendicular to the wire electrode traveling to or from the workpiece.

In yet another embodiment, a set of jaws are provided and are adapted for selective movement toward and away from each other. Counterbores are provided and extend into each of the jaws and a first group of sphere-shaped balls are received in one of the jaw counterbores whereas a second group of sphere-shaped balls are received in the second jaw counterbore. The jaws are retained apart during automatic threading and other similar operations whereas they are brought together when electrode guidance is required. When the jaws are moved toward each other, the first and second groups of balls nest with one another and form an opening therebetween generally perpendicular to the jaws wherethrough the electrode is received and is guided. The balls are retained in the respective counterbores with an annular lip located on each of the respective jaws and protruding radially into the counterbores.

In one form thereof, the present invention is directed to an electrode guide including at least three sphere-shaped balls in contact with one another and forming an opening therebetween. The electrode is received through the opening and is guided by the balls.

In one form thereof, the present invention is directed to an electrode guide including a set of jaws adapted for selective movement toward and away from each other. A counterbore extends into each of the jaws. A first group of at least three sphere-shaped balls are received in one of the jaw counterbores and a second group of at least three sphere-shaped balls are received in the second jaw counterbore. When the jaws are moved toward each other, the first and second groups of balls nest with one another and form an opening therebetween for receiving the electrode therethrough.

BRIEF DESCRIPTION OF THE DRAWINGS

The above-mentioned and other features and objects of this invention and the manner of obtaining them will become more apparent and the invention itself will be better understood by reference to the following description of embodiments of the invention taken in conjunction with the accompanying drawings wherein:

FIG. 1 is a vertical cross-sectional view of an assembly for an EDM locating arm and including an electrode guide constructed in accordance with the principles of the present invention;

FIG. 2 is an enlarged vertical cross-sectional view of part of the electrode guide shown in FIG. 1;

FIG. 2a is a bottom plan view of the electrode guide shown in FIG. 2;

FIG. 3 is a vertical cross-sectional view of a second embodiment of an electrode guide constructed in accordance with the principles of the present invention;

FIG. 4 is a vertical cross-sectional view of a third embodiment of an electrode guide constructed in accordance with the principles of the present invention;

FIG. 4a is a bottom plan view of the electrode guide shown in FIG. 4;

FIG. 4b is a partial cross-sectional view of the electrode guide shown in FIG. 4 and taken along line 4b—4b;

FIG. 5 is a vertical cross-sectional view of a fourth embodiment of an electrode guide constructed in accordance with the principles of the present invention;

FIG. 5a is a partial bottom plan view of the electrode guide shown in FIG. 5;

FIG. 5b is a cross-sectional view of the electrode guide shown in FIG. 5 but wherein the electrode is exiting the guide at an angle with respect to the normal line of electrode travel;

FIG. 5c is a partial bottom plan view of the electrode guide shown in FIG. 5b;

FIG. 6 is a top plan view of yet another embodiment of an electrode guide constructed in accordance with the principles of the present invention and incorporating a set of jaws;

FIG. 6a are front elevation views of the jaw faces of the embodiment shown in FIG. 6;

FIG. 6b are side elevation views of the jaws shown in FIG. 6;

FIG. 6c is a vertical cross-sectional view of the jaws shown in FIG. 6 in a closed position and taken along line 6c—6c;

FIG. 7a is a top plan view of an electrode guide constructed in accordance with the principles of the present invention and incorporating three balls;

FIG. 7b is a top plan view of an electrode guide constructed in accordance with the principles of the present invention and incorporating four balls;

FIG. 7c is an electrode guide constructed in accordance with the principles of the present invention incorporating five balls and depicting a polygonal-shaped electrode; and, FIG. 7d is a top plan view of an electrode guide constructed in accordance with the present invention incorporating different size balls and depicting a rectangular-shaped electrode.

The exemplifications set out herein illustrate preferred embodiments of the invention in one form thereof and such exemplifications are not to be construed as limiting the scope of the disclosure or the scope of the invention in any manner.

DESCRIPTION OF THE PREFERRED EMBODIMENTS

Referring initially to FIG. 1, there is shown a cartridge assembly generally designated by the numeral 10. Cartridge assembly 10 is used in electrical discharge wire cutting machines to guide a wire electrode 12 and to form a column 14 of deionized fluid. Cartridge assembly 10 is mounted on an EDM arm which is selectively movable in any direction both horizontally and vertically in a known and customary manner. For boring holes, a single cartridge assembly 10 is typically used and electrode 12 is shaped identical to that of the desired bore shape. In such uses, the electrode 12 is merely located over the workpiece and is selectively lowered as needed for creating the desired bore or other shapes. When a moving consumable wire electrode 12 is used, two cartridge assemblies 10 are incorporated, typically one above and one below the workpiece, and the electrode 12 travels out from one of the cartridge assemblies to the workpiece whereat the cutting action is occurring and thereafter back into the other cartridge assembly.

As shown in the embodiment of FIG. 1, the electrode guide includes three sphere-shaped balls 16 arranged in a plane generally perpendicular to wire electrode 12 and, as best shown in FIG. 2a, in contact with one another. In this embodiment, balls 16 are equal sized and together form a generally triangularly-shaped opening 18 with circular shaped sides 19. Thus, electrode 12 is bound by the outer surfaces 20 of balls 16. Depending on the relative sizes of balls 16 and therefore opening 18, and also the diameter of electrode 12, electrode 12 comes in contact with one or more outer surfaces 20 of balls 16.

Balls 16 are located within a bore 22 extending through a guide housing 24. Bore 22 has a first open end or opening 26 and a second open end or opening 28. As shown, first opening 26 is smaller than second opening 28. A frusto-conical shaped surface/bore 30 is provided near first end 26. Balls 16 rest on frusto-conical shaped surface 30 with their outer surface 20 in contact therewith. It is noted that because balls 16 are equal sized, they will always automatically be concentric with frusto conical surface/bore 30 as long as they are in a plane perpendicular to longitudinal axis 38.

A first cylindrical member 32 is coincident with the housing bore 22 and is received therein adjacent balls 16. First cylindrical member 32 includes a centrally located passageway 34 wherethrough electrode 12 is received and an annular flat surface 36 at one end thereof perpendicular to longitudinal axis 38 and adjacent to and in contact with balls 16. First cylindrical member 32 is retained within bore 22 by threading, biasing with a spring or other similar means, for example, as shown in FIG. 4, and/or other suitable means. Accordingly, as cylindrical member 32 is biased toward the first end 26 of bore 22, balls 16 are forced toward the longitudinal axis 38 or wire electrode 12 and in contact with one another in a plane perpendicular to longitudinal axis 38.

Depending on the biasing force provided by first cylindrical member 32 against balls 16, balls 16 are either allowed to turn or are fixed in their respective positions. When a biasing force sufficient to fix balls 16 in position is provided, if wire electrode 12 is sufficiently large, it too will be fixed longitudinally. However, if electrode 12 is slightly larger, equal to or smaller than opening 18, wire electrode 12 is freely movable longitudinally therethrough and will merely be guided by the outer surfaces 20 of balls 16. It is further noted that the biasing force can be selectively provided for selectively grasping electrode 12 and/or relaxing balls 16 during threading operations.

Assembly 10 further includes a flush cup 40 generally surrounding one end of housing 24 and having a hole 42 generally aligned with opening 18 and adapted for receiving electrode 12 therethrough. An opening 44 is also provided through flush cup 40 wherethrough a dielectric fluid such as deionized water can be pumped or otherwise forced into flush cup 40 and surrounding housing 24. As indicated by arrows A, the dielectric fluid entering opening 44 travels around housing 22 and thereafter exits through hole 42 forming a dielectric column of fluid 14.

A second opening 46 is also provided, for example, through flush cup 40, housing 24, and first cylindrical member 32 in communication with passageway 34 of first cylindrical member 32. Dielectric fluid is also pumped or otherwise forced through opening 46 and into passageway 34 as indicated by arrows B. The dielectric fluid traveling through passageway 34 then travels around balls 16 and out through first opening or open end 26 forming a central column of fluid 48 surrounding electrode 12 and being generally coaxial with fluid column 14. As can be appreciated, any debris or other particles within passageway 34 or around balls 16 tend to be flushed out by the dielectric fluid traveling therethrough thereby retaining the area generally clean. Additionally, this fluid provides cooling of balls 16 and electrode 12 thereby effectively increasing the efficiency thereof. Further yet, it is preferred that the dielectric fluid being forced through bore 34 and around balls 16 and finally forming column 48 be at a temperature lower than the dielectric fluid forming column 14 thereby providing the colder dielectric fluid only in the needed areas and thereby increasing the efficiency of the assembly without wasting energy in the form of heat. For example, the dielectric fluid of column 48 can be at a temperature just above freezing whereas the dielectric fluid forming column 14 can be at ambient temperature.

The fluid pumped through passageway 46 into passageway 34 can also be used to impart a kinetic impetus to the electrode wire to carry it from the upper head to the lower head in an automatic electrode wire threading operation. In this embodiment, no fluid is pumped through passageway 44 and flushing stream 14 is suspended. An identical lower cartridge is employed and a light vacuum can be applied to its passageway 46 to enhance the threading operation.

As shown in FIG. 1, a current pickup 50 can also be provided in assembly 10 for frictionally engaging wire electrode 12 and transferring current to and from the electrode. Further, an orifice type guide 52 can be provided at the other end of cylindrical member 32 for centrally locating wire guide 12 through passageway 34 of cylindrical member 32 and/or to provide a seal and prevent fluid flow out of passageway 34. Alternatively, rather than a current pickup 50, electrical current can be transferred to and from wire electrode 12 by making balls 16 along with housing 24 and/or cylindrical member 32 of a conductive material such as steel or carbide and thereby providing current to the wire electrode through either or both housing 24 and cylindrical member 32 through balls 16 and then to electrode 12. Alternatively, balls 16 can be made of a non-conductive material such as sapphire or diamond thereby preventing electrical current between balls 16 and wire electrode 12. In any event, balls 16 are preferably made of one or more different hard materials such as diamond, sapphire, carbide, or other similar ultra hard materials.

Referring now to FIG. 3, there is shown a second embodiment wherein a second set of three equal size sphere-shaped balls 54 are provided and are in contact with one another and form an opening therebetween similar to that of balls 16. The second set of balls 54 are located in the housing bore 22 at the upper end of cylindrical member 32 and adjacent annular flat surface 56. A second cylindrical member 58 having a passageway 60 and an annular flat surface 62 is provided in bore 22 thereby sandwiching balls 54 between first cylindrical member 32 and second cylindrical member 58 and between annular flat surfaces 56 and 62. Wire electrode 12 extends through passageway 60, the opening created by balls 54, passageway 34, the opening 18 created by balls 16, and through first open end 26 of housing 24. In general, the purpose of the second set of balls is to fix the longitudinal axis of the housing 24. The squareness (or angularity) of the electrode to the work-piece is therefore assured. Also, aiming of the electrode in a threading operation can also be assured. Accordingly, wire electrode 12 in this embodiment is supported and/or guided by both balls 16 and balls 54 at two different locations longitudinally apart from one another. Similar to the embodiment of FIG. 1, first and second cylindrical members 32 and 58 are retained within bore 22 by threading or a biasing means such as a spring. Preferably, a spring member similar to that of FIG. 4 provides a biasing force as indicated by the arrow C for pushing or biasing second cylindrical member 58, balls 54, first cylindrical member 32 and balls 16 toward the housing bore first end 26 and keeping these components in contact with one another.

Referring now to FIG. 4, a third embodiment is shown also incorporating a first set of three sphere-shaped balls 16. Here, a second set of three equal size sphere-shaped balls are provided adjacent the first set of balls 16. Both ball sets 16 and 54 are in planes generally perpendicular to wire electrode 12 and, as in the foregoing discussed embodiments, are in contact with one another and form a generally triangular-shaped opening therebetween. Additionally, as best shown in FIGS. 4a and 4b, the second set of balls 54 are located in a nesting relation with respect to the first set of balls 16 at an angle of 360 degrees divided by the total number of balls in both of the sets, here 60 degrees. That is, each ball 54 is radially shifted with respect to balls 16 at an angle α which is 60 degrees in the embodiment shown and always 360 degrees divided by the total number of balls in both of the ball sets. In FIG. 4b, the generally triangular-shaped opening between balls 54 is shown by the numeral 64 and the opening between balls 16 is again shown by the numeral 18. Because of the radial shifting of the two sets of balls at an angle α, wire electrode 12 is exposed to a generally hexagonal opening 66 as viewed from the longitudinal. Accordingly, a more precise guidance opening is provided for the guidance of wire electrode 12. Additionally, if ball set 54 were made of conductive material, current transfer could be affected.

Although nested balls 16 and 54 can be retained in many different housing shapes and those discussed hereinabove, in FIG. 4, there is shown a housing 24 including an end cap 68 either selectively attached to housing 24 by threading or other suitable means or permanently affixed thereto by welding, friction fit or other suitable means. Here, the frusto-conical surface 30 is provided on end cap 68 and balls 16 rest thereon similar to that of the embodiments of FIGS. 1 and 2. As can be appreciated by selectively detachably attaching end cap 68 to housing 24, balls 16 and 54 can easily be removed and replaced as needed from the working end 70 thereof which typically faces the workpiece.

At the other end of balls 16 and 54, a cylindrical member 72 is provided and includes a central passageway 74 for receiving electrode 12 therethrough and further includes annular lip 76 extending into enlarged bore 78 of housing 24. A spring member 80 is located within enlarged bore 78 and is captured therein between retaining ring 82 and annular lip 76 of cylindrical member 72. Accordingly, spring member 80 acts to bias cylindrical member 72 toward balls 54 and 16 keeping the balls in a nested position and also retaining balls 16 against frustoconical surface 30. As can be appreciated, a solenoid and other electrical and mechanical means can be employed for drawing cylindrical member 72 against the force of spring member 80 and selectively relaxing balls 16 and 54. For example, cylindrical member 72 can be extended through ring member 82 and into a coil in a manner whereby cylindrical member 72 and the coil operate similar to a solenoid.

Referring now to FIGS. 5–5c, there is shown a fourth embodiment wherein wire electrode 12 can more easily and accurately exit and enter housing 24 at an angle with respect to longitudinal axis 38 for taper or angle cutting and shaping. Here, housing 24 can include, for ease of manufacturing, outer cylindrical member 84, inner cylindrical member 86, frusto-conical member 88, and ball retaining member 90. As can be appreciated, one or more of these components can be integrally manufactured as needed and as may be convenient. Housing 24 includes a central bore 92 wherethrough wire electrode 12 is received. Bore 92 includes a sphere-shaped passageway or surface 94 whereat three sphere-shaped equal size balls 16 are located. Annular stop surface 96 is provided on cylindrical member 86 and protrudes radially inwardly into sphere-shaped passageway 94 for aiding and retaining balls 16 therein. It is noted that frusto-conical member 88 can also be shaped so as to provide a similar annular flat surface extending radially inwardly for aiding in retaining balls 16 within sphere-shaped passageway 94, although this is not absolutely necessary.

In operation, as shown in FIGS. 5 and 5a, when wire electrode 12 is traveling longitudinally along axis 38, balls 16 remain in a plane as shown by dashed line 98 generally perpendiclar to wire electrode 12. Here, a generally triangular opening 18 similar to the embodiments discussed hereinabove is provided and guides wire electrode 12. However, if a taper cut is desired, the upper and lower assemblies 10 and guide housings 24 thereof are shifted horizontally with respect to one another placing wire electrode 12 at an angle with respect to the longitudinal axis 38, as shown in FIG. 5b. Because balls 16 are freely movable within sphere-shaped passageway 94, balls 16 will automatically rotate both radially either clockwise or counterclockwise around wire electrode 12 placing wire electrode 12 inbetween two of the balls 16. Additionally, balls 16 will shift vertically in a manner whereby plane 98 thereof will be at angle with respect to the longitudinal axis 38 and also perpendicular to wire electrode 12 exiting or entering housing 24. It is noted that this turning and shifting of balls 16 is caused solely by the wire electrode tangential force against the outer surfaces 20 of balls 16. Wire electrode 12, in essence, seeks the path of least resistance and balls 16 shift within sphere-shaped passage-way 94 providing the same. Additionally, as best shown in FIG. 5b, as wire electrode bends from the longitudinal axis 38 to an angle out of housing 24, it contacts at least two of the balls 16 along a generally circular arc, the diameter of which depends on the size of balls and diameter of wire electrode 12.

Referring now to FIGS. 6–6c, a fifth embodiment is shown incorporating a pair of jaws 100 which are similarly shaped and are adapted to move in a known and customary manner toward and away from each other as indicated by arrows D. Each of jaws 100 include faces 102 which are adapted to come together and be adjacent one another when jaws 100 are brought together as shown in FIG. 6c. Counterbores 104 are provides in each of jaws 100 extending into jaws 100 from faces 102. Counterbores 104 of each of jaws 100 are aligned with one another so as to form a barrel cavity 106 as best shown in FIG. 6c. The right-hand jaw includes a lower wire electrode passageway 108 communicating with counter-bore 104 and the left-hand jaw 100 includes an upper wire electrode passageway communicating with the counterbore 104 thereat. Further, ball insertion apertures 112 are provided in each of jaws 100 and extend therethrough in communication with respective counterbores 104. An annular lip 114 is provided on each of the jaw faces 102 protruding radially into counterbores 104. Accordingly, counterbores 104 have an radial diameter greater than that of annular lip 114.

A first group of three sphere-shaped equal size balls are located within the counterbore 104 of the left-hand jaw and a second group of equal size sphere-shaped balls are located and provided within the counterbore 104 of the right-hand jaw. Each of these groups of balls are placed within their respective counterbores by first placing two balls therein either through the counterbore opening or through ball insertion apertures 114 and thereafter placing the third ball therein through ball insertion apertures 114. It is noted that annular lips 114 protrude sufficiently radially into counterbores 104 for retaining the balls therein. An insertion pin (not shown) is then placed within each of the ball insertion apertures 112 thereby preventing the balls from exiting therefrom and keeping them in their respective counterbores. It is further noted that both groups of balls in respective left and right hand jaw counter-bores are located in planes that are located approximately 20 degrees from longitudinal axis 38. This is accomplished by placing the bottom surfaces of counterbores 104 at an angle of about 20 degrees from the longitudinal axis 38.

As shown in FIGS. 6 and 6b, during threading and other similar operations, the jaws are separated from one another thereby providing a large gap therebetween as needed or desired. When guidance of the wire electrode 12 is required, the jaws 100 are brought together as shown in FIG. 6c thereby creating a lower set of three balls 16 and an upper set of three balls 54 similar to those shown in FIGS. 4–4b and discussed hereinabove. The set of balls 16 are nested with the set of balls 54 and are radially shifted from one another at an angle of 360 degrees divided by the total number of balls in both of the sets, here, again 60 degrees. Similar to FIG. 4b, this nesting relation and the hexagonal opening created by the six balls is depicted in FIG. 6 whereat the barrel cavity 106 and balls are shown between jaws 100 as they would appear when brought together. Similar to that of FIG. 4b, a hexagonal opening is created as viewed along the longitudinal axis for guidance of wire electrode 12. Thus, as best shown in FIG. 6c, wire electrode 12 travels through upper wire electrode passage 110, through both sets of balls 54 and 16 and out through lower wire electrode passage 108.

Referring now to FIG. 7a, there is shown three equal size sphere-shaped balls 16 forming a generally triangular shape, the triangle of which has circular or curvilinear sides which guide wire electrode 12. Here, it has been determined that the ratio of the diameter of the balls divided by the diameter of the wire electrode where the balls are in contact with one another and the electrode is in contact with each of the balls is approximately 6.464124.

In FIG. 7b, there is shown four same size sphere-shaped balls 16 in contact with one another and forming a somewhat square-shaped opening where the square sides are circular or curvilinear shaped. Here, the opening is larger than when three balls are used thereby being able to guide a larger diameter size electrode 12 with smaller diameter size sphere balls 16. The ratio of the diameter of the balls divided by the diameter of the electrode where the balls are in contact with one another and the electrode is in contact with each of the balls is approximately 2.414292.

In FIG. 7c, there is shown a guide wherein five sphere-shaped same diameter size balls 16 create a generally hexagonal or polygonal opening and guide a wire electrode 118 which is hexagonal in cross section.

FIG. 7d shows two sphere-shaped balls 120 each in contact with two smaller sphere-shaped balls 122 creating an opening and guiding a rectangular-shaped electrode 124.

While the invention has been described as having specific embodiments, it will be understood that it is capable of further modifications. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. An electrode guide comprising:
    at least three sphere-shaped balls in contact with one another and forming an opening therebetween, whereby an electrode is received through said opening and is guided by said balls; and,
    a guide housing having a bore extending therethrough and including a frusto-conical shaped surface, said balls resting on said frusto-conical shaped surface with said opening aligned with said bore, whereby said electrode extends through said housing bore and said opening.

2. The electrode guide of claim 1 wherein said balls are substantially equal in size.

3. The electrode guide of claim 1 wherein said balls are made of a material selected from a group consisting of diamond, sapphire and carbide.

4. The electrode guide of claim 3 further comprising a cylindrical member coincident with said housing bore adjacent said balls opposite said frusto-conical surface and sandwiching said balls between said frusto-conical surface and said cylindrical member, whereby said electrode also extends through said cylindrical member.

5. The electrode guide of claim 4 wherein said cylindrical member is selectively biased toward said balls and frusto-conical surface thereby forcing said balls towards a longitudinal axis of said frusto-conical surface and in contact with one another.

6. The electrode guide of claim 5 wherein said cylindrical member includes an annular flat surface in contact with and forcing said balls toward said frusto-conical surface.

7. The electrode guide of claim 1 wherein said balls are electrically conductive, whereby electric current can be transferred to and from the electrode.

8. An electrode guide comprising:
    at least three sphere-shaped balls in contact with one another and forming an opening therebetween, whereby an electrode is received through said opening and is guided by said balls;
    a guide housing having a bore extending therethrough having a first open end and a second open end, said first open end being smaller than said second open end, said balls located in said bore adjacent said first open end, and a cylindrical member received in said bore sandwiching said balls between said bore first end and said cylindrical member, whereby said electrode extends through said cylinder and housing bore; and,
    wherein said cylindrical member is selectively biased toward said bore first end and said balls.

9. The electrode guide of claim 8 wherein said balls are substantially equal in size.

10. The electrode guide of claim 8 wherein said balls are electrically conductive, whereby electric current can be transferred to and from the electrode.

11. The electrode guide of claim 8 wherein said balls are made of a material selected from a group consisting of diamond, sapphire and carbide.

12. An electrode guide comprising:
    at least three sphere-shaped balls in contact with one another and forming an opening therebetween, whereby an electrode is received through said opening and is guided by said balls;
    a guide housing having a bore extending therethrough having a first open end and a second open end, said first open end being smaller than said second open end, said balls located in said bore adjacent said first open end, and a cylindrical member received in said bore sandwiching said balls between said bore first end and said cylindrical member, whereby said electrode extends through said cylinder and housing bore;
    a second set of at least three sphere-shaped balls in contact with one another and forming an opening therebetween, said second set of balls located in said housing bore at the other end of said cylindrical member, whereby said electrode also extends through the opening of said second set of balls and is guided thereby; and,
    a second cylindrical member received at least in part in said bore adjacent to and sandwiching said second set of balls between said first and second cylindrical members, whereby said electrode also passes through said second cylindrical member.

13. The electrode guide of claim 12 wherein said second cylindrical member, second set of balls, first cylindrical member, and first set of balls are all selectively biased toward said housing bore first end.

14. The electrode guide of claim 12 wherein said balls are substantially equal in size.

15. The electrode guide of claim 12 wherein said balls are electrically conductive, whereby electric current can be transferred to and from the electrode.

16. The electrode guide of claim 12 wherein said balls are made of a material selected from a group consisting of diamond, sapphire and carbide.

17. An electrode guide comprising:

at least three sphere-shaped balls in contact with one another and forming an opening therebetween, whereby an electrode is received through said opening and is guided by said balls; and, a housing having a sphere-shaped passageway for receiving said electrode therethrough, said balls located and retained in said passageway.

18. The electrode guide of claim 17 further comprising annular stop surfaces at the openings of said sphere passageway whereby said balls are prevented from exiting said passageway.

19. The electrode guide of claim 17 wherein said balls are substantially equal in size.

20. The electrode guide of claim 17 wherein said balls are electrically conductive, whereby electric current can be transferred to and from the electrode.

21. The electrode guide of claim 17 wherein said balls are made of a material selected from a group consisting of diamond, sapphire and carbide.

22. An electrode guide comprising:

at least three sphere-shaped balls in contact with one another and forming an opening therebetween, whereby an electrode is received through said opening and is guided by said balls; and, wherein said guide includes two equal size balls of a first size and two equal size balls of a second size, said second size balls being larger than said first size.

23. The electrode guide of claim 22 wherein said balls are electrically conductive, whereby electric current can be transferred to and from the electrode.

24. The electrode guide of claim 22 wherein said balls are made of a material selected from a group consisting of diamond, sapphire and carbide.

25. An electrode guide comprising:

at least three sphere-shaped balls in contact with one another and forming an opening therebetween, whereby an electrode is received through said opening and is guided by said balls; and, further comprising a guide housing having a bore extending therethrough, said bore having a first open end and a second open end, said balls located in said bore adjacent said first open end, a flush cup surrounding said housing and having a hole aligned with said opening for receiving said electrode therethrough, wherein a dielectric fluid is forced into said cup and exits through said hole around said electrode, and further wherein a dielectric fluid is also forced into said housing bore and travels at least in part through said opening and out through said flush cup hole.

26. The electrode guide of claim 25 wherein said dielectric fluid being forced through said bore is colder than said dielectric fluid being forced through said flush cup.

27. The electrode guide of claim 25 wherein said balls are electrically conductive, whereby electric current can be transferred to and from the electrode.

28. The electrode guide of claim 25 wherein said balls are made of a material selected from a group consisting of diamond, sapphire and carbide.

29. An electrode guide comprising a set of jaws adapted for selective movement toward and away from each other, a counterbore extending into each of said jaws, a first group of at least three sphere-shaped balls received in one of said jaw counterbores and a second group of at least three sphere-shaped balls received in said second jaw counterbore and, wherein when said jaws are moved toward each other said first and second groups of balls nest with one another and form an opening therebetween for receiving said electrode therethrough.

30. The electrode guide of claim 29 wherein said second group of balls are equal in number to said first group of balls and, in said nested position, said first and second group of balls form a first set and a second set of balls, each of said sets of balls located in planes generally perpendicular to said electrode and wherein said second set of balls are radially shifted with respect to said first set of balls at an angle of 360 degrees divided by the total number of balls in both of said sets.

31. The electrode guide of claim 30 wherein the total number of balls in both said first and second sets is six.

32. The electrode guide of claim 30 further comprising ball insertion apertures in each of said jaws extending through said respective jaws and communicating with said respective counterbores, whereby one or more balls are selectively placed in said counterbores through said ball insertion apertures.

33. The electrode guide of claim 30 further comprising an annular lip on each of said respective jaws protruding radially into said counterbores, whereby said balls are retained in said counterbores.

34. The electrode guide of claim 29 further comprising ball insertion apertures in each of said jaws extending through said respective jaws and communicating with said respective counterbores bores, whereby one or more balls are selectively placed in said counterbores through said ball insertion apertures.

35. The electrode guide of claim 29 further comprising an annular lip on each of said respective jaws protruding radially into said counterbores, whereby said balls are retained in said counterbores.

36. The electrode guide of claim 29 wherein said balls are electrically conductive, whereby electric current can be transferred to and from the electrode.

37. The electrode guide of claim 29 wherein said balls are made of a material selected from a group consisting of diamond, sapphire and carbide.

38. An electrode guide comprising:

at least three sphere-shaped balls in contact with one another and forming an opening therebetween, whereby an electrode is received through said opening and is guided by said balls; and, wherein said balls are electrically conductive, whereby electric current can be transferred to and from the electrode.

* * * * *